May 27, 1969
W. N. LINDSAY
3,447,047
MOTOR DRIVEN VARIABLE CAPACITOR
Filed March 20, 1968
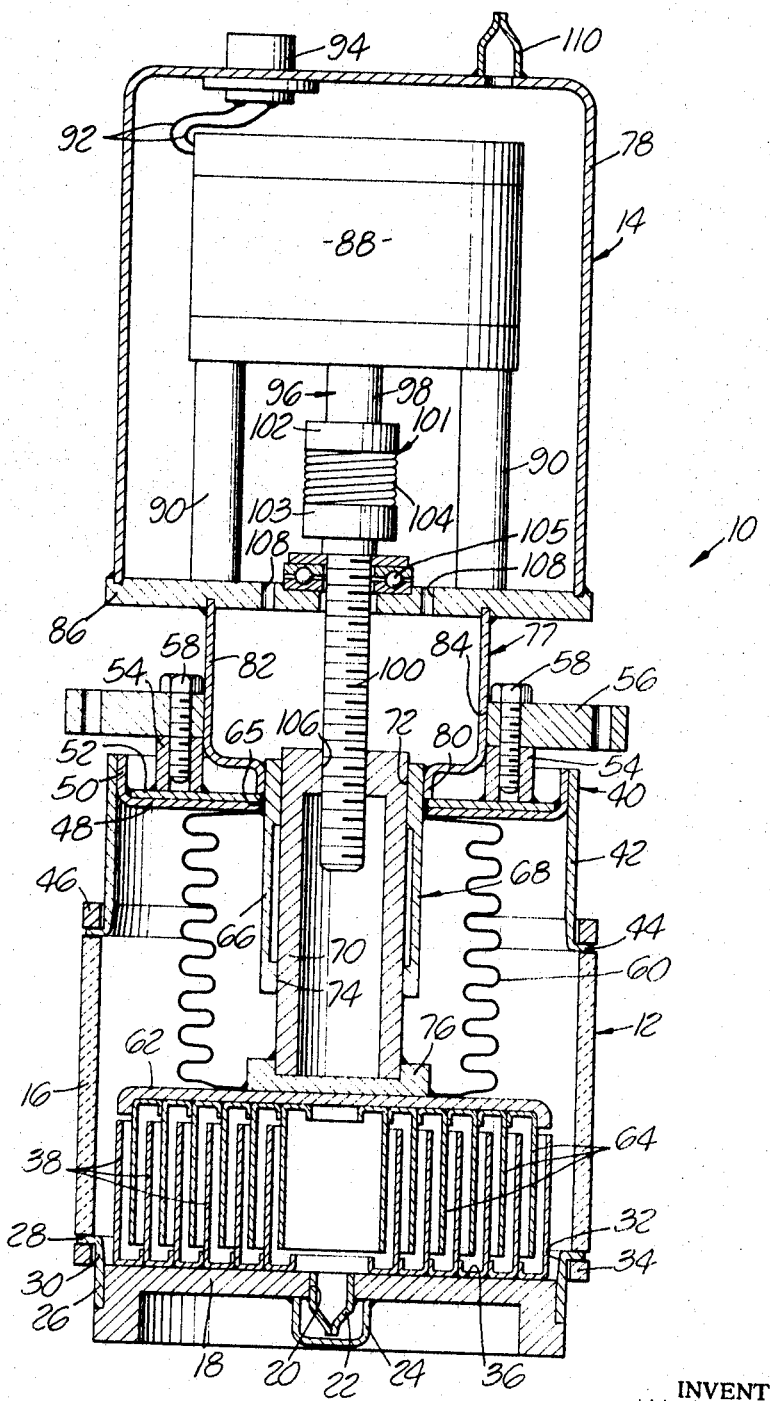
INVENTOR
W. LINDSAY
BY Thomas L. Peterson
ATTORNEY ced May 27, 1969

3,447,047
MOTOR DRIVEN VARIABLE CAPACITOR
Wesley Newton Lindsay, 10710 Ridgeview Ave.,
San Jose, Calif. 95127
Filed Mar. 20, 1968, Ser. No. 714,602
Int. Cl. H01g 5/02
U.S. Cl. 317—245                               8 Claims

ABSTRACT OF THE DISCLOSURE

A variable capacitor in which the hermetically sealed envelope thereof is divided into a high-vacuum compartment and a relatively low-vacuum compartment by an expansible bellows. The fixed and mobile electrodes of the capacitor are disposed in the high-vacuum compartment while a reversing motor and translation mechanism for the mobile electrode are disposed in the other compartment. The provision of a partially evacuated compartment for the motor and translation mechanism reduces the pressure differential across the bellows, thereby reducing the torque requirements of the motor and permitting the use of conventional lubricants for the motor and translation mechanism. This principle may also be applied to a vacuum switch.

Background of the invention

This invention relates generally to a variable capacitor and, more particularly, to a motor driven hermetically sealed variable vacuum capacitor.

There are basically two arrangements for effecting axial translation of the mobile electrode in a motor driven variable vacuum capacitor. In one of these arrangements, the reversing motor and translation mechanism for the mobile electrode are mounted externally of the high vacuum chamber in which the fixed and mobile capacitor electrodes are disposed. In this arrangement, a bellows is incorporated which functions both as an expansible wall of the high vacuum compartment containing the electrodes and as a hermetic seal isolating the translation mechanism and motor from the interior of the compartment. While this arrangement permits the use of conventional organic lubricants and seals in the motor and the translation mechanism, it has the disadvantage that there is a substantial pressure differential across the bellows, namely, atmospheric pressure exists outside the bellows while a high vacuum, on the order of 10⁻⁵ to 10⁻⁸ torr, exists within the bellows. As a result of this high differential pressure, substantial stresses are imposed upon the bellows thus limiting the life of the capacitor. In addition, the differential pressure imposes a high torque requirement on the motor, thus adding to the expense and size of the assembly.

In the second arrangement of a motor driven variable capacitor, the motor and translation mechanism are both mounted within the high vacuum envelope of the capacitor which eliminates the pressure differential problem discussed above. However, this arrangement has the disadvantage that the motor and translation mechanism, being disposed in the vacuum envelope of the capacitor, are subjected to bake-out temperatures utilized during manufacturing to out-gas metal parts within the envelope, which temperatures may range from about 850° to 1000° F. Since conventional organic varnishes, insulating material and lubricants utilized in electrical motors would evaporate at such temperatures and thus contaminate the electrodes in the capacitor, in this form of a capacitor it is necessary that rather expensive motors be employed which use special inorganic insulating materials and lubricants. Also, this arrangement requires the use of grease and oil free bearings for the motor shaft and translation mechanism, which may cause the parts within the vacuum envelope to become subject to excessive friction caused by seizing. Thus, what is desired and constitutes the object of the present invention is to provide a motor driven variable vacuum capacitor which embodies the advantages of both of the types of capacitors discussed above, and substantially overcomes the disadvantages thereof.

Summary of the invention

According to the principal aspect of the present invention there is provided a motor driven variable vacuum capacitor in which the hermetically sealed envelope thereof is divided into two separate compartments by an expansible sealing means, preferably a metallic bellows. The fixed and mobile electrodes of the capacitor are mounted in one of the compartments while the motor and translation mechanism for the mobile electrode are mounted in the second compartment. As in conventional capacitors, the bellows is hermetically sealed to the mobile electrode so as to permit axial movement of the electrode by the translation mechanism. The compartment housing the electrodes of the capacitor is evacuated to provide a high vacuum while the other compartment housing the motor and translation mechanism is evacuated to provide a lower degree of vacuum, namely, a vacuum intermediate the high vacuum in the electrode compartment and atmospheric pressure. By this arrangement, the pressure differential across the bellows which separates the two compartments is substantially reduced, thus reducing the torque requirement of the motor and relieving the stresses normally imposed upon bellows in the conventional capacitor arrangement wherein the motor and translation mechanism are mounted externally of the vacuum envelope of the capaictor. In addition, because the compartment housing the motor and translation mechanism is evacuated to a relatively low degree of vacuum, a conventional motor employing organic lubricants and seals may be employed in the capacitor of the present invention as well as organic lubricants for the bearings which support the motor shaft and translation mechanism. Other objects and advantages of the invention will become apparent from the following description taken in connection with the accompanying drawing.

Brief description of the drawing

The drawing is a longitudinal cross-sectional view of the preferred form of the capacitor of the present invention.

Description of the preferred embodiment

Referring now to the drawing in detail, the motor driven variable vacuum capaictor 10 of the present invention includes a hermetically sealed envelope consisting of two separate compartments 12 and 14. The compartment 12 comprises a tubular insulator 16, preferably formed of ceramic, which is closed at its lower end by a metallic end wall 18. The wall 18 is centrally apertured as indicated at 20 to receive a metallic tubulation 22 which functions as a valve for evacuating the compartment 12. After evacuation of the compartment the tubulation 22 is pinched as shown and protected by a cap 24 brazed to the wall 18.

Hermetically heliarc welded about an outer peripheral portion of the wall 18 is a cylindrical flange 26 extending inwardly into the compartment 12 and provided at its inner end with a radially extending relatively thinner flange 28 hermetically bonded as by brazing to the adjacent metallized end surface of the ceramic envelope section 16. As shown in the drawing, the cylindrical flange 28 is slightly smaller in diameter than the tubular ceramic section 16, and meets the flange 26 at substantially a right angle.

In order to accommodate differences in thermal expansion and contraction between the ceramic section 16 and the metallic flange 26, the flange is provided with a thinned down portion 30 adjacent to radially extending flange 28, formed by providing a tapered surface 32 on the interior of flange 26. Thus, since metal flange 26 will expand and contract to a greater extent than ceramic envelope section 16, the thinned down portion 30 of the flange compensates through flexure for shear stresses which would otherwise be imposed directly on the hermetic union. The thickness of flange 26 is selected to permit the ceramic member to dominate this portion of the structure. Such domination of the flange 26 by the ceramic is aided by bonding a backing ring 34 to the surface of flange 28 opposite the ceramic section 16.

Brazed to the inner surface 36 of the end wall 18 is a set of condensor plates comprising a plurality of cylindrical concentrically arranged thin metallic plates 38. The end of each plate 38 adjacent to end wall 18 is provided with a radially extending and reentrant flange construction which functions to rigidly bind adjacent plates to one another and to end wall 18.

The opposite or upper end of the ceramic section 16 is closed by an end cap assembly, generally designated 40, and is referred to for convenience of reference as the mobile end cap assembly of the compartment 12. This assembly includes an axially extending cylindrical metallic flange 42 which extends into the ceramic section 16 and is provided with a radially extending flange 44 at its inner end which is hermetically joined to the associated metallized end surface of the ceramic envelope section 16. The flange 42 possesses a configuration similar to flange 26 for purposes of compensation of thermal expansion and contraction in the manner previously discussed. A ceramic backing ring 46 serves to strengthen the union between the flange 44 and the ceramic section 16. An annular end wall 48 is provided with an upwardly extending cylindrical flange 50 which is hermetically bonded as by brazing to the inner upper surface of the flange 42. The end wall 48 is strengthened by an annular ring 52 which is welded thereto at its upper surface. The end wall 48 and the ring 52 support a plurality of upwardly extending internally threaded projections 54. A centrally apertured panel mounting plate 56 is assembled to the projections 54 by fastener elements 58.

An expansible seal, preferably in the form of a metallic bellows 60, is provided for separating the two compartments 12 and 14 of the capacitor envelope. The bellows is concentrically mounted within the envelope compartment 12 and is heliarc welded at its inner or lower end to a mobile electrode metallic end plate 62. Brazed to the lower surface of the plate 62 is a set of mobile condensor plates 64 of generally the same construction as the fixed plates 38 and interposed therebtween in spaced relationship as seen in the drawing. The upper end of the bellows 60 is heliarc welded to the inner peripheral edge 65 of the annular end wall 48 and to the outer surface of a concentrically mounted sleeve 66 of the translation mechanism for the mobile condenser plates 64, generally designated 68. The translation mechanism includes, in addition to the sleeve 66, a hollow stem 70 which is slidably supported on upper and lower bearing surfaces 72 and 74, respectively, on the sleeve. The lower end of the stem 70 is fixedly mounted as by welding to a centrally recessed plate 76 which is in turn welded to the upper surface of the end plate 62.

The envelope compartment 14 includes the interior of the bellows 60, in which the translation mechanism 68 is mounted, intermediate section 77 and an upper cylindrical housing section 78. The intermediate section 77 is provided at its lower end with a reduced diameter cylindrical flange 80 which is welded to the outer surface of the sleeve 66. The intermediate section also includes an enlarged cylindrical upper portion 82 which is tightly fitted within a central aperture 84 in the mounting plate 56. The upper end of the cylindrical portion 82 supports a circular plate 86 which supports the housing 78. These parts are hermetically sealed together as by brazing or welding.

A reversing motor 88 is fixedly positioned in the housing 78 and is supported on the plate 86 by a plurality of posts 90. The motor leads 92 are connected to a hermetic connector 94 in the upper part of the housing 78.

The motor shaft 96 preferably includes two sections 98 and 100 which are connected by a coupling, generally designated 101. This coupling includes end parts 102 and 103 fixed to the two respective shaft sections 98 and 100 and are interconnected by an intermediate helical or coil section 104 which is rotationally rigid but laterally flexible so as to accommodate for any misalignment between the shaft section 98 and the translation mechanism 68. The shaft section 100 is rotationally mounted in a thrust bearing 105 mounted on the plate 86 and is formed at its lower portion with screw threads which threadedly engage the internally threaded upper section 106 of the stem 70. A plurality of passages 108 are provided in the plate 86 to connect the space within the housing 78 with the cylindrical section 77 and the interior of the bellows 60.

A valve 110 in the form of a metallic tubulation on the housing 78 is provided for evacuating the compartment 14. This tubulation is pinched closed as shown in the drawing after evacuation of the compartment.

From the foregoing it can be seen that by the present invention there is provided a motor driven variable capacitor in which the fixed and mobile condensor plates 38 and 64, respectively, are positioned in a hermetically sealed compartment 12 which is isolated from a second hermetically sealed compartment 14 containing the motor 88 and translation mechanism 68 by means of the bellows 60. The compartment 12 is evacuated through the tubulation 22 to a pressure preferably in the range of about $10^{-5}$ to $10^{-8}$ torr, which is the normal degree of vacuum employed in conventional vacuum capacitors. It is understod that 0 torr equals a perfect vacuum while 760 torr is equivalent to one standard atmosphere, or 14.7 lbs. per sq. inch pressure. Thus, a relatively high vacuum is provided in the compartment 12.

In accordance with the principal feature of the present invention, a relative low vacuum, preferably on the order of about 1 torr to 500 torr is provided in the compartment 14 by evacuating the same through the tubulation 110. The preferred degree of vacuum in the compartment 14 is about 25 torr, which is equivalent to about .05 lb. per sq. inch absolute pressure. Thus, by providing a high vacuum in the compartment 12 and a relatively lower vacuum in the compartment 14, the pressure differential across the bellows 60 which exists in conventional externally mounted motor driven variable capacitors is greatly reduced, thus reducing the stresses on the bellows, increasing the life thereof, and substantially decreasing the torque requirements of the motor 88. However, the pressure differential between the two compartments is sufficient to overcome lost motion or backlash between the threaded shaft 100 and stem 70 upon reverse rotation of the motor 88. In addition, because the motor 88 and translation mechanism 68 are mounted in a relatively low-vacuum envelope, conventional organic lubricants may be utilized on the bearing surfaces, thus overcoming the problems of seizing which occurs in high vacuum condtions. There are available on the market many lubricants which have a vapor pressure less than 1 torr and thus would be suitable for use in the compartment 14.

The present invention further has the advantage that the bearing surfaces for the motor shaft and translation mechanism are isolated from atmospheric contaminants such as dirt, dust, moisture, smoke, etc. Also, the driving assembly of the capactior, namely the housing 78, housing section 77, motor 88, coupling 102, shaft 96, and thrust bearing 104 may be assembled to the compartment 12 after the latter has been subject to brakeout temperatures for outgassing the metallic parts thereof. As a consequence, the motor may be of the conventional type employing organic varnishes, insulating materials, and lubricants.

In operation of the capacitor 10, the shaft 96 is trapped against axial displacement by the thrust bearing 104 but is capable of rotation with the motor 88. Energizing the motor to rotate the threaded shaft section 100 effects axial translation of the stem 70 thus carrying the mobile electrodes 64 into and out of intermeshing relation with the fixed electrodes 38. While the complementary engaging means on the outer surface of the shaft 100 and the stem 70 are shown as being screw threads, it is understood that other suitable means could be utilized to advantage, such as a reciprocating ball arrangement.

It is to be understood that the terms high-vacuum and low-vacuum compartments utilized herein and in the claims, in referring to the compartments 12 and 14, respectively, have reference only to the degree of evacuation of these comparements and not to their relative elevational disposition. Obviously, the capacitor 10 may be disposed in any desired physical orientation, with either of the compartments being disposed above the other or on the same level.

While the principles of the present invention are described specifically as applied to a vacuum capacitor, it can be appreciated that they could also be applied to a motor driven vacuum switch of the type in which coaxial switch contacts are brought into and out of engagement to make or break a circuit through the switch. Thus, the use of the term "vacuum device" in the claims is intended to encompass vacuum switches as well as vacuum capacitors.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and devices.

What is claimed is:

1. A vacuum device comprising: a hermetically sealed envelope; a hermetically sealed partition dividing said envelope into first and second compartments, the pressure in said first compartment being less than the pressure in said second compartment; fixed and mobile electrodes in said first compartment; a reversing motor in said second compartment including a movable driving member, and means in said second compartment operatively interposed between said driving member and mobile electrode to effect movement of the mobile electrode upon movement of said driving member.

2. A vacuum device as set forth in claim 1 wherein said first compartment includes a tubular insulator section and first and second metallic end walls, said first end wall closing one end of said tubular insulator section and carrying said fixed electrode on the inside face thereof, said second end wall being annular and hermetically sealed at its outer periphery to the other end of said tubular insulator section; said partition including an expansible metal bellows coaxial with said tubular insulator section and sealed to said second end wall; and said mobile electrode moving means extending concentrically into said bellows and including a portion thereof fixed relative to said mobile electrode.

3. A vacuum device as set forth in claim 2 wherein said portion of said mobile electrode moving means comprises a hollow stem fixed at one end relative to said mobile electrode and internally threaded at its other end, and said driving member being threadedly engaged in said other end of said hollow stem.

4. A vacuum device as set forth in claim 3 including a sleeve concentrically interposed between said hollow stem and bellows, said sleeve being fixed to said second annular end wall and supporting said hollow stem for axial displacement of the latter.

5. A vacuum device as set forth in claim 3 wherein said driving member is the drive shaft of said motor, said drive shaft including two coaxial sections interconnected by a laterally flexible coupling means.

6. A vacuum device as set forth in claim 1 including valve means on each of said compartments for facilitating separate evacuation of said compartments.

7. A vacuum device as set forth in claim 1 including bearing means in said second compartment for rotatably supporting said driving member.

8. A vacuum device as set forth in claim 1 wherein said first compartment is evacuated to a range of about $10^{-8}$ to $10^{-5}$ torr and said second compartment is evacuated to a range of about 1 to 500 torr.

References Cited

UNITED STATES PATENTS 3,213,340  10/1965  Robertson _____ 317—250 X

LEWIS H. MYERS, *Primary Examiner.*

E. A. GOLDBERG, *Assistant Examiner.*

U.S. Cl. X.R.

200—144; 317—250